(12) United States Patent
Josefiak

(10) Patent No.: US 10,147,132 B2
(45) Date of Patent: Dec. 4, 2018

(54) SYSTEM AND METHOD FOR SELECTION OF TWO PARAMETERS VIA UI ELEMENT

(71) Applicant: Frank Josefiak, Bonn Bad Godesberg (DE)

(72) Inventor: Frank Josefiak, Bonn Bad Godesberg (DE)

(73) Assignee: Deutsche Post AG, Bonn (DE)

(*) Notice: Subject to any disclaimer, the term of this patent is extended or adjusted under 35 U.S.C. 154(b) by 614 days.

(21) Appl. No.: 14/527,547

(22) Filed: Oct. 29, 2014

(65) Prior Publication Data

US 2016/0125515 A1 May 5, 2016

(51) Int. Cl.
*G06F 3/0484* (2013.01)
*G06F 17/30* (2006.01)
*G06Q 30/06* (2012.01)
*G06Q 10/08* (2012.01)

(52) U.S. Cl.
CPC ....... *G06Q 30/0641* (2013.01); *G06Q 10/083* (2013.01); *G06F 3/0484* (2013.01); *G06F 3/04847* (2013.01); *G06F 17/30* (2013.01); *G06F 17/30386* (2013.01)

(58) Field of Classification Search
CPC .... G06F 3/04847; G06F 3/0484; G06F 17/30; G06F 17/30386; G06Q 30/0641; G06Q 10/083

See application file for complete search history.

(56) References Cited

U.S. PATENT DOCUMENTS

| | | | |
|---|---|---|---|
| 8,078,603 B1* | 12/2011 | Chandratillake | G06F 17/30846 707/706 |
| 2004/0008208 A1* | 1/2004 | Dresevic | G06F 1/1607 345/589 |
| 2004/0254808 A1* | 12/2004 | Bennett | G06Q 10/08 705/26.1 |
| 2005/0171940 A1* | 8/2005 | Fogg | G06F 17/30554 |
| 2005/0197892 A1* | 9/2005 | Bilibin | G06Q 10/025 705/13 |
| 2009/0293019 A1* | 11/2009 | Raffel | G06F 3/04847 715/833 |

(Continued)

OTHER PUBLICATIONS

Sony website screenshot, Xperia Z2 Tablet 16GB WiFi, captured Sep. 8, 2014.
Amazon website screenshot, captured Sep. 8, 2014.

*Primary Examiner* — Ting Z Lee
(74) *Attorney, Agent, or Firm* — Reinhart Boerner Van Deuren P.C.

(57) ABSTRACT

A method performed by one or more apparatuses is provided. The method comprises: obtaining information on a manipulation of a UI element performed by a user, wherein the UI element has a plurality of states allowing for a selection of one of the states by the user, a first state of the UI element being associated with a first value, the value being a value of a first parameter, and a second state of the UI element being associated with a second value, the second value being a value of a second parameter different from the first parameter. The method further comprises selecting a dataset from a set of datasets at least based on the obtained information, some or all of the datasets of the set of datasets associating a value of the first parameter with a value of the second parameter, and providing information on said selected dataset.

17 Claims, 8 Drawing Sheets

(56) References Cited

U.S. PATENT DOCUMENTS

2011/0025924 A1* 2/2011 Price .................. G06F 3/04847
                                                                  348/734
2015/0378546 A1* 12/2015 Osborne ............ G06F 3/04847
                                                                  715/833

* cited by examiner

| ID | Tradelane | Network | Service | Price in EUR | Delivery Time | Max Weight in kg | Special Requirements | Tracking Included | Max Height in mm | Max Width in mm | Max Depth in mm | Max Dimensions (L*B*H) | Carbon Neutral Included? |
|---|---|---|---|---|---|---|---|---|---|---|---|---|---|
| 5 | GER-USA | Co. A Mail Network | parcel service 2 | 40,00 € | 5 | 20 | | yes | | | | | |
| 6 | GER-USA | Co. A Mail Network | parcel service 1 | 27,00 € | 6 | 20 | | no | | | | | |
| 7 | GER-USA | Co. A Mail Network | packet service 2 | 17,00 € | 7 | 2 | | yes | | | | | |
| 8 | GER-USA | Co. A Mail Network | packet service 1 | 15,00 € | 4 | 2 | | no | | | | | |
| 9 | GER-USA | Co. A Mail Network | return service | 16,00 € | 10 | 27 | | | | | | | |
| 25 | GER-GER | Co. A Packet Network | parcel service 3 | 4,00 € | 2 | 2 | | yes | 500 | 300 | 150 | | Yes |
| 27 | GER-USA | Co. A Packet Network | parcel service 3 | 11,00 € | 1 | 2 | | yes | 500 | 500 | 500 | 1000 | |
| 33 | GER-USA | Co. B Letter Network | large letter | 3,00 € | 3 | 0,5 | | | | | | | |
| 38 | GER-USA | Co. B Letter Network | post card | 1,00 € | 3 | 0,02 | | | | | | | |
| 43 | GER-USA | Co. B Letter Network | book service 1 | 3,00 € | 10 | 0,5 | Product=Book | | | | | | |
| 44 | GER-USA | Co. B Letter Network | book service 1 | 2,00 € | 13 | 0,5 | Product=Book | | | | | | |
| 45 | GER-USA | Co. B Letter Network | book service 1 | 6,00 € | 12 | 1 | Product=Book | | | | | | |
| 46 | GER-USA | Co. B Letter Network | book service 1 | 5,00 € | 13 | 1 | Product=Book | | | | | | |
| 47 | GER-USA | Co. B Letter Network | book service 1 | 12,00 € | 10 | 2 | Product=Book | | | | | | |
| 48 | GER-USA | Co. B Letter Network | book service 1 | 10,00 € | 13 | 2 | Product=Book | | | | | | |

FIG. 6A

| ID | Tradelane | Network | Service | Price in EUR | Delivery Time | Max Weight in kg | Special Requirements | Tracking Included | Max Height in mm | Max Width in mm | Max Depth in mm | Max Dimensions (L*B*H) | Carbon Neutral Included? |
|---|---|---|---|---|---|---|---|---|---|---|---|---|---|
| 38 | GER-USA | Co. B Letter Network | post card | 1,00 € | 3 | 0,02 | | | | | | | |
| 44 | GER-USA | Co. B Letter Network | book service 1 | 2,00 € | 13 | 0,5 | Product=Book | | | | | | |
| 43 | GER-USA | Co. B Letter Network | book service 1 | 3,00 € | 10 | 0,5 | Product=Book | | | | | | |
| 33 | GER-USA | Co. B Letter Network | large letter | 3,00 € | 3 | 0,5 | | | | | | | |
| 25 | GER-GER | Co. A Packet Network | parcel service 3 | 4,00 € | 2 | 2 | | yes | 500 | 300 | 150 | | Yes |
| 46 | GER-USA | Co. B Letter Network | book service 1 | 5,00 € | 13 | 1 | Product=Book | | | | | | |
| 45 | GER-USA | Co. B Letter Network | book service 1 | 6,00 € | 12 | 1 | Product=Book | | | | | | |
| 48 | GER-USA | Co. B Letter Network | book service 1 | 10,00 € | 13 | 2 | Product=Book | | | | | | |
| 27 | GER-USA | Co. A Packet Network | parcel service 3 | 11,00 € | 1 | 2 | | yes | 500 | 500 | 500 | 1000 | |
| 47 | GER-USA | Co. B Letter Network | book service 1 | 12,00 € | 10 | 2 | Product=Book | | | | | | |
| 8 | GER-USA | Co. A Mail Network | packet service 1 | 15,00 € | 4 | 2 | | no | | | | | |
| 9 | GER-USA | Co. A Mail Network | return service | 16,00 € | 10 | 27 | | | | | | | |
| 7 | GER-USA | Co. A Mail Network | packet service 2 | 17,00 € | 7 | 2 | | yes | | | | | |
| 6 | GER-USA | Co. A Mail Network | parcel service 1 | 27,00 € | 6 | 20 | | no | | | | | |
| 5 | GER-USA | Co. A Mail Network | parcel service 2 | 40,00 € | 5 | 20 | | yes | | | | | |

FIG. 6B

| ID | Tradelane | Network | Service | Price in EUR | Delivery Time | Max Weight in kg | Special Requirements | Tracking Included | Max Height in mm | Max Width in mm | Max Depth in mm | Max Dimensions (L*B*H) | Carbon Neutral Included? |
|---|---|---|---|---|---|---|---|---|---|---|---|---|---|
| 27 | GER-USA | Co. A Packet Network | parcel service 3 | 11,00 € | 1 | 2 | | yes | 500 | 500 | 500 | 1000 | |
| 25 | GER-GER | Co. A Packet Network | parcel service 3 | 4,00 € | 2 | 2 | | yes | 500 | 300 | 150 | | yes |
| 38 | GER-USA | Co. B Letter Network | post card | 1,00 € | 3 | 0,02 | | | | | | | |
| 33 | GER-USA | Co. B Letter Network | large letter | 3,00 € | 3 | 0,5 | | | | | | | |
| 8 | GER-USA | Co. A Mail Network | packet service 1 | 15,00 € | 4 | 2 | | no | | | | | |
| 5 | GER-USA | Co. A Mail Network | parcel service 2 | 40,00 € | 5 | 20 | | yes | | | | | |
| 6 | GER-USA | Co. A Mail Network | parcel service 1 | 27,00 € | 6 | 20 | | no | | | | | |
| 7 | GER-USA | Co. A Mail Network | packet service 2 | 17,00 € | 7 | 2 | | yes | | | | | |
| 43 | GER-USA | Co. B Letter Network | book service 1 | 3,00 € | 10 | 0,5 | Product=Book | | | | | | |
| 47 | GER-USA | Co. B Letter Network | book service 1 | 12,00 € | 10 | 2 | Product=Book | | | | | | |
| 9 | GER-USA | Co. A Mail Network | return service | 16,00 € | 10 | 27 | | | | | | | |
| 45 | GER-USA | Co. B Letter Network | book service 1 | 6,00 € | 12 | 1 | Product=Book | | | | | | |
| 44 | GER-USA | Co. B Letter Network | book service 1 | 2,00 € | 13 | 0,5 | Product=Book | | | | | | |
| 46 | GER-USA | Co. B Letter Network | book service 1 | 5,00 € | 13 | 1 | Product=Book | | | | | | |
| 48 | GER-USA | Co. B Letter Network | book service 1 | 10,00 € | 13 | 2 | Product=Book | | | | | | |

FIG. 6C

SYSTEM AND METHOD FOR SELECTION OF TWO PARAMETERS VIA UI ELEMENT

FIELD OF THE INVENTION

This invention generally relates to systems and methods for selecting parameters in the field of e-commerce, and more particularly to systems and methods for the selection of options pertaining to shipping, such as shipping time, shipping costs and shipping provider.

BACKGROUND OF THE INVENTION

At the time being, in the field of e-commerce the selection of a shipping option is performed by the customer after or during the finalization of a purchase in an online store. Often, more than one shipping option is selectable. Regularly, not only different providers (such as DHL, UPS, FedEx, DPD, and others) but also different products or services of a specific provider (such as express shipping or parcel shipping) are selectable. Regularly, the customer is only given the choice to influence shipping time. That means either the customer chooses a longer delivery period (with usually lower costs) or the customer chooses a faster delivery period (with usually higher costs).

An increase of the online selectable shipping options (due to multiple providers offering their shipping solutions online, or due to an easier selectability of additional options, such as $CO_2$ neutral solutions, insured shipping, track and trace, or combined shipping of multiple shipments) will lead to a more complex selection. Thereby, the selection process will be more and more complex, unwieldy and non-simple for both the operator of the online store (who needs to provide different shipping solutions) and the customer (who struggles to find the ideal solution for his situation). Particularly for the customer, the selection process can quickly become very user-unfriendly. Additionally, some of the options (for instance the addition of a $CO_2$ neutral shipping option) may not influence costs or delivery time in as much as the customer would assume. However, because of the perceived influence, e.g. on cost, the customer may forego a desired option.

Thus, the selection of shipping services and options becomes an increasingly nontransparent and complex process of optimization, during which the user (in this case the end customer) is not supported. This can lead to a situation where the customer may refrain from a purchase, meaning that no purchase order is made as the customer cannot find the desired shipping service/option, or where the customer demand for a simple and ideal shipping solution is not complied with resulting in dissatisfaction.

Generally, the customer assesses the quality of a shipping procedure in view of the so called "7R" of Edward G. Plowmann, i.e.
   the right product,
   to the right customer,
   in the right amount,
   at the right place,
   in the right state,
   in the right shipping time,
   at the right costs.

For instance, regarding the parameters of the right shipping time and the right costs, shipping may be performed in less than 12 hours by a courier as well as in 4 weeks by shipping as collective consignment via sea freight. Additionally, the state of the shipped consignment can be supervised and protected (for instance by real time tracking, actively or passively cooled transports, shipping with further security options etc.). The differences in costs may be immense and it may be difficult for the customer to estimate or select them, as some products cannot be combined with others (for instance, low cost real time tracking and expedited shipping). In addition, the customer can often only select a small pre-picked selection of shipping options. However, due to disappearing barriers in the area of information technology (i.e. more and more options can be provided) and due to an increasing transparency, the selectable options will need to increase. The customer will therefore have to meet the challenge to select the shipping option suitable for his demands.

However, in the state of the art, this is mainly done by comparing individual options with each other in a "binary way", i.e. option A is faster, option B is slower, option C is in between and so forth. Each of the options is presented as an individual option to be selected. For instance, for each option A, B, C, etc. multiple radio buttons (as an example of multiple UI elements) or multiple entries of a drop down list (as an example of multiple UI elements) are presented to the customer and the customer has to select one of the UI elements in order to indicate his or her option. However, this leads to the nontransparent, complex and tedious process of selecting a shipping option, as outlined above. Additionally, during the selection process, the customer is often not informed about the specific provider performing the shipping, as the information is either not available or not shown to the customer. However, this may be of importance to the customer.

It is therefore an object of the invention, inter alia, to overcome one or more of the aforementioned disadvantages. Embodiments of the present invention provide, inter alia, methods, apparatuses, systems, programs, and storage media for selecting a dataset via a relational UI element. These and other advantages of the invention, as well as additional inventive features, will be apparent from the description of the embodiments of the invention provided herein.

BRIEF SUMMARY OF THE INVENTION

In a first aspect, embodiments of the invention provide methods performed by one or more apparatuses, the methods include obtaining information on a manipulation of a UI element performed by a user. Preferably, the UI element has a number of states allowing for a selection of one of the states by the user. A first state of the UI element is associated with a first value, which is a value of a first parameter. The second state of the UI element is associated with a second value, which is a value of a second parameter different from the first parameter. The methods also include selecting a dataset from a set of datasets at least based on the obtained information. Some or all of the datasets of the set of datasets respectively associate a value of the first parameter with a value of the second parameter. Finally, the methods include providing information on the selected dataset.

The methods according to the embodiments of the invention can be carried out by one or more data-processing apparatuses. Examples of a data-processing apparatus are a computer, a personal computer, a portable computer, a thin client, a personal digital assistant, a mobile telephone and/or any other electronic device which has at least one processor.

In particular, the method according to embodiments of the invention can be carried out by one or more servers, for example by one or more servers in the field of e-commerce, such as by one or more servers of a merchant of an online store and/or by one or more servers of a shipping service provider. The method can also be carried out by one or more servers and by at least one client connected to the one or more servers. A server is to be understood to mean, in particular, a data-processing unit in a network which communicates via the network with one or more data-processing units, the clients, in order to provide them with services and/or computing power. In a client-server architecture of this type, the services provided by the server and/or the computing power can be used by a plurality of clients so that the clients themselves, for example, have to retain less own computing power or, as another example, do not need to be provided with a larger database. A server and a client can designate both a data-processing apparatus and a program which is executed on the data-processing apparatus. The network is, for example, a local area network, a wide area network, a virtual network, a radio network, a telephony network and/or the Internet. The communication is effected, for example, in a wireless or wired manner.

One or more of the servers may, for example, be database servers. Examples of a database server are a Microsoft SQL Server, an Oracle server and a MySQL server. The servers may, for example, be part (for example a "component") of a so called computer cloud which makes data-processing resources available dynamically to different users via a network. A computer cloud is intended to be understood to mean, in particular, a data-processing infrastructure according to the definition of the "National Institute for Standards and Technology" (NIST) for the English term "Cloud Computing". An example of a computer cloud is a Microsoft Windows Azure Platform.

A UI element is understood to mean a user interface element, which allows a user to interact with a machine or apparatus. For instance, the UI element may be an element of a direct manipulation interface, which allows users to manipulate objects presented to them, using actions that correspond to the physical world. For instance, the UI element may be an element of a graphical user interfaces (GUI), which accepts an input via devices such as a computer keyboard and/or a mouse and provides graphical output on a computer monitor. As another example, the UI element may be an element of a web user interface (WUI) that accept input and provide output by generating web pages which are transmitted via the Internet and viewed by the user using a web browser program. A web user interface may utilize Java, JavaScript, AJAX, Adobe Flex, Microsoft .NET, or similar technologies to provide real-time control in a separate program. As a further example, the UI element may be an element of a touch user interface, which is a graphical user interface using a touchpad or touchscreen display as a combined input and output device. A touchpad or touchscreen may accept input by touch (and/or close approach) of a finger or a pen. As yet another example, the UI element may also be an element of a hardware interface, which is a physical, spatial interface. They may be one or more of knobs, buttons, sliders, switches, and touchscreens.

Thus, as non-limiting examples, a manipulation of the UI element may be realized by the user using the mouse or the keyboard to drag a slider thumb (as an example of the UI element) of a slider (as an example of the UI) displayed on a computer screen, or to turn or rotate a knob (as another example of a UI element and UI).

The obtained information on the manipulation of the UI element performed by the user may comprise information representative for the state of the UI element selected by the user. The information on the manipulation may comprise absolute information, such as an absolute state of the UI element, or relative information, such as a relative change of the state of the UI element compared to a previous state.

A state of said UI element may be understood to mean a state, for instance a position or location that the UI element can be brought into by the manipulation of the UI element by the user. It is understood that the method is not limited to a first and a second parameter. For instance, there may be a third state of the UI element being associated with a third value of a third parameter.

As an example, one or more of the parameters may be parameters the value of which the user has to select, for instance before, after or during finalization of an online purchase. In particular, the user may have an (assumed) interest for the value of one parameter to be as high/large or as low/small as possible. In particular, the user may have an interest for the value of the first parameter to be as small/low as possible and may have an interest for the value of the second parameter to be as small/low as well at the same time.

The association of the first (or second) state with the first (or second) value may be understood to mean that the respective state is only associated with the first (or second) value, but not with the second (or first) value. For instance, the respective state may represent a respective value of the respective state. For instance, the state of the UI element of the UI may represent a value of the first parameter or a value of the second parameter depending on the state of the UI element.

The set of datasets from which the dataset is selected may be stored in one or more databases. The datasets and/or the information provided by a dataset may also originate from different data sources, for example from databases of different providers or companies. For instance, the database may be a database of a database server, such as a Microsoft SQL Server, an Oracle server or a MySQL server. As another example, the database may be a Microsoft Excel database. The datasets may also be provided by multiple databases. The database may be stored on one or more of the one or more apparatuses. For instance, the database may be stored on the server of a merchant of an online store. The database may also be updated or pushed onto a server in order to keep the database up to date. For instance, the database may be pushed from a server of a logistics company to a server of a merchant of an online store.

The association of a value of the first parameter with a value of the second parameter by some or all datasets may be understood to mean that some or all datasets respectively assign a value of the first parameter to a value of the second parameter (or vice versa). For instance, the datasets may each or in part comprise a value of the first parameter and a value of the second parameter. For instance, the datasets may also comprise information allowing for the calculation of the respective value. The values of the first and/or second parameters may be unique values among the values in the datasets. It may also be that multiple values of the first parameter are associated with an identical value of the second parameter (or vice versa), i.e. the values of the first and/or second parameters do not need to be unique values in the datasets.

As a result of utilizing embodiments of different aspects of the invention, it is inter alia possible for the user to select values of two different parameters over a single UI element in a user-friendly manner. For instance, according to embodiments of aspects of the invention, a user does not need to tediously compare all the values of a first and a second parameter of multiple individual options with each other. Rather, only a single UI element is necessary in order to for the user to select two different parameters.

According to an embodiment of the method according to the invention, the first parameter and the second parameter are correlated to each other. A correlation of the first and the second parameter may be understood as any departure of the two parameters from being independent. That is, a value of the first parameter cannot be chosen completely independent of the value of the second parameter (or vice versa). More specifically, a correlation may be understood that the first and the second parameter have a special type of dependency. For instance, there may be a correlation of the kind that there is an at least partly substantially linear, proportional or anti-proportional dependence between the first and the second parameter. For instance, the first and the second parameter may generally show a correlation of the kind "the higher the value of the first parameter, the higher (or lower) the value of the second parameter". This correlation may be developed more or less strongly. As an example, the first parameter may relate to a performance and the second parameter may relate to costs, wherein the costs may be or comprise the costs for receiving the performance. Here, the first and the second parameter may show a positive correlation, as generally "the higher the performance, the higher the costs".

According to an embodiment of the method according to the invention, the first parameter and the second parameter are negatively correlated to each other. In other words, the first and the second parameter may generally show a correlation of the kind "the higher the value of the first parameter, the lower the value of the second parameter". However, this does not need to be strictly true, as the correlation may be developed more or less strongly. However, this does not necessarily define the kind of negative correlation, e.g. the correlation may be of a linear, an anti-proportional or another type of negative correlation. As an example, the first parameter may relate to shipping time while the second parameter may relate to costs, wherein the costs may be or comprise the costs for achieving said shipping time. The term shipping time may be understood to mean the time it takes for the delivery to take place, that it is the delivery period. It is noted that with an improving performance, the specific parameter representing the performance, e.g. the shipping time, may be decreasing with improving performance, leading to a negative correlation.

According to an embodiment of the method according to the invention, the first value of the first parameter associated with the first state of the UI element is an extreme value of the first parameter. Additionally or alternatively, the second value of the second parameter associated with the second state of the UI element is an extreme value of the second parameter. For instance, the extreme value may be an overall extreme value (e.g. a globally extreme value). For instance, if a parameter is costs, the extreme (minimum) value may be 0, that is for free, or if a parameter is shipping time, the extreme (minimum) value could be 0 or "now". A dataset may be selected, which associates or comprises a respective value, which is as close as possible to the extreme value, that is as cheap as possible or as short as possible. For instance, the extreme value may be a minimum or maximum value of the respective parameter. For instance, the extreme value may be an upper or lower bound of a set which bound is also an element of that set. For instance, the set may be a set of respective first or second values associated by or comprised in the datasets from which the dataset is selected.

According to an embodiment of the method according to the invention, the method further comprises providing at least one of an indicator indicating to select the first state in order to select an extreme value of the first parameter and an indicator indicating to select the second state in order to select an extreme value of the second parameter. Preferably, both, a first and a second indicator are provided. Preferably, the one or more indicators provide relative information about the extreme value of the first or second parameter, respectively. For instance, the one or more indicators may be positioned close to the first and or second state of the UI element. The one or more indicators may comprise a text or symbol. For instance, the indicators may read "as cheap as possible", "as fast as possible", or "as safe as possible", respectively. Preferably the indicators do not provide absolute information on a value of a parameter. For instance, absolute values of the first and second parameter may be obtained by obtaining information on the selected dataset.

According to an embodiment of the method according to the invention, some or all (for instance each) of the states of the UI element is associated with a respective value, the value being one of at least a value of the first parameter and a value of the second parameter. For example, the number of states of the UI element may be larger, smaller or equal to the number of datasets of the set of datasets, from which the dataset is selected, associating a value of the first parameter with a value of the second parameter. For instance, if the number of states of the UI element and the number of datasets of the set of datasets, from which the dataset is selected, does not equal, the number of states of the UI element may be adjusted to match the number of datasets of the set of datasets, from which the dataset is selected. For instance, if the number of states of the UI element is larger than the number of datasets of the set of datasets, from which the dataset is selected, multiple (for instance consecutive) states of the UI element may be associated with a single value of the first or second parameter associated by the datasets of the set of datasets. For instance, if the number of states of the UI element is smaller than the number of datasets of the set of datasets, from which the dataset is selected, the states of the UI element may not be associated with every value of the first or second parameter associated by the datasets of the set of datasets.

According to an embodiment of the method according to the invention, the selecting of the dataset from the set of datasets based on the obtained information is based on the association of some or all (e.g. each) of the states of the UI element with the respective values. For instance, if by manipulation of the UI element, a state of the UI element is selected, the particular dataset is selected from the set of datasets, which associates or comprises the value of the first or second parameter, which value of the first or second parameter is associated with the selected state of the UI element. In an alternative, if by manipulation of the UI element, a state of the UI element is selected, a dataset may be selected from the set of datasets, which dataset associates or comprises a value of the first or second parameter, which value of the first or second parameter is closest to the value of the first or second parameter associated with the selected state of the UI element.

According to an embodiment of the method according to the invention, the UI element allows for a movement of the UI element in order to select the states of the UI element. For instance, the movement of the UI element may be a translatory or rotary movement or a combination thereof. More particular, the movement may for instance be a one-dimensional translatory movement or a rotary movement in a plane. The movement may for instance be a sliding movement. For instance, the UI element may be a slider thumb of a slider or a bar of a scroll bar. The UI element may also be a turning knob, rotary knob, adjusting knob, control knob or the like. For instance the user may manipulate the UI element by using a mouse, keyboard or touch screen by dragging the UI element in a linear or rotary motion. As further examples, the user may alternatively or additionally manipulate the UI element by voice control and/or gesture control.

According to an embodiment of the method according to the invention, the first state of the UI element constitutes a first limit of the UI element and the second state of the UI element constitutes a second limit of the UI element. For instance, the first or second state of the UI element constituting the first and second limit of the UI element, respectively, may be the marginal state or position of the UI element, for instance the leftmost, rightmost, topmost or bottommost state or position of the UI element. For instance, in case of a slider, the first and second state of the slider thumb, respectively, are the most extreme positions of the slider thumb on the slider track. The first and second limits may be understood to be a first and second boundary of or for the UI element, limiting a possible movement of the UI element.

According to an embodiment of the method according to the invention, some or all (e.g. each) of the datasets of the set of datasets from which the dataset is selected comprises a value of the first parameter and a value of the second parameter. The association of a value of the first parameter with a value of the second parameter by the datasets is realized by the datasets comprising a value for the first and second parameter each. For instance, the values of the first and second parameters may be stored in a specific row or column of the dataset. For instance, the values of the first and second parameters may or may not be allowed to be empty or have N/A-values.

According to an embodiment of the method according to the invention, the method further comprises associating some or all states (e.g. each state) of a first subset of the states of the UI element comprising the first state with one of the values of the first parameter comprised by the datasets of the set of datasets from which the dataset is selected, and associating some or all states (e.g. each state) of a second subset of the states of the UI element comprising the second state with one of the values of the second parameter comprised by the datasets of the set of datasets from which the dataset is selected. For instance, each state of the first/second subset of the states of the UI element is associated with a subset of the values of the first/second parameter comprised by the datasets of the set of datasets from which the dataset is selected. For instance, the first and second subset of the states of the UI element may be disjoint. For instance, the union of the first and the second subset of the states of the UI element may comprise all of the states of the UI element. For instance, the first subset of the states of the UI element may be a first number of consecutive states of the UI element. For instance, the second subset of the states of the UI element may be a second number of consecutive states of the UI element. In particular, the first or second subset of the states of the UI element may be a first or second half of the states of the UI element, respectively, for instance, the first half of the states being the states on one (e.g. the left) side of the user interface, the second half of the states being the states on the other (e.g. the right) side of the user interface. Preferably, the UI element has at least as many states as datasets in the set of datasets from which the dataset is selected. For instance, each state may have a corresponding dataset among the set of datasets from which the dataset is selected.

According to an embodiment of the method according to the invention, the method includes sorting the datasets of the set of datasets from which the dataset is selected by the first parameter, and sorting the datasets of the set of datasets from which the dataset is selected by the second parameter. In this embodiment, the method also includes associating some or all states (e.g. each state) of a first subset of the states of the UI element including the first state with one of the values of the first parameter, comprised by the datasets of the set of datasets from which the dataset is selected, in an order resulting from the sorting of the set of datasets from which the dataset is selected by the first parameter. Further, the method includes associating some or all states (e.g. each state) of a second subset of the states of the UI element comprising the second state with one of the values of the second parameter, comprised by the datasets of the set of datasets from which the dataset is selected, in an order resulting from the sorting of the set of datasets from which the dataset is selected by the second parameter.

The sorting of the datasets is understood to mean arranging the datasets into an ordered sequence. For instance, the ordering may be ascending or descending. For instance, the first and/or the second parameter to be ordered may pertain to a parameter in which the user has an (assumed) interest to be as high/large or as low/small as possible. This may determine the direction of ordering. For instance, the user (e.g. a customer of a web store) may regularly be interested in (shipping) costs as low as possible, and/or in a shipping time as low as possible (i.e. the shipping is as fast as possible). In this case, the costs as well as the shipping time would be ordered ascending, as the user is interested in low values of these parameters. An example of a parameter, the user would be interested in to be as high as possible, may be the safety of a shipping procedure.

According to an embodiment of the method according to the invention, each of the datasets of the set of datasets from which the dataset is selected comprises information on one or more of a product, a delivery point of origin, a delivery point of destination, an ecological footprint, a tracking/tracing option, an insurance option, shipping.

The information on a product may comprise information on a product purchased or about to be purchased, e.g. from merchant, in particular via an online store. The information may comprise an identification of the product itself and/or information pertaining to the product. The information on a product may also comprise information on a weight or a volume of a product. The information on a product may also comprise information on a product category, which may for instance comprise information on a harmonized system code (hs code). As examples, such a code may comprise one or more categories of "animal & animal products", "vegetable products", "foodstuffs", "mineral products", "chemicals & allied industries", "plastics/rubbers", "raw hides, skins, leather, & furs", "wood & wood products", "textiles", "footwear/headgear", "stone/glass", "metals", "machinery/electrical", "transportation", "miscellaneous", "service". This may be relevant as certain requirements/restriction may apply for the shipping of certain products. The datasets may also comprise information on more than one product.

Information on a delivery point of origin may for instance comprise an address, a region, a state, a country, a distribution center, or a hub. For instance, the information on a delivery point of origin may pertain to a merchant or retailer.

Information on a delivery point of destination may for instance comprise an address, a region, a state, a country, a distribution center, or a hub. The information on a delivery point of destination may for instance pertain to an address chosen by the user (e.g. a delivery address such as a home address).

Information on an ecological footprint may for instance comprise information on a greenhouse gas (e.g. carbon) emission or on an availability of climate or carbon neutral shipping.

Information on a tracking option may for instance comprise information on an availability of tracking/tracing options, such as real time tracking, barcode scanning and/or passive/active RFID.

Information on insurance options may for instance comprise information on an availability of one or more insurance options, such as additional insurance. Information on insurance options may for instance comprise information on the insurance fee, the insurance coverage and/or the insurance terms.

Information on shipping may for instance include information on a shipping time. For instance, information on the time it (approximately) takes for a consignment to be delivered may be provided. The information may also comprise information on a guaranteed maximum shipping time. The information on shipping may comprise information on costs, which may at least comprise information on shipping costs. The costs may also comprise further costs, such as costs for additional shipping options (e.g. tracking, carbon neutral shipping and/or insured shipping), taxes, customs duty, handling and/or costs of the one or more products. Further, the information on shipping may comprise a parcel category. As a further example, the shipping information may comprise information on a weight or volume range, in which a product may be shipped. For instance, information on an allowable weight or a volume of a product may comprise a maximum weight or volume (for instance by providing maximum dimensions) allowable (e.g. for a certain shipping option or parcel category). The information on shipping may comprise information on the shipping network (e.g. the logistical provider). The product may be shipped as a consignment. For instance it may be shipped as a letter, a registered letter, a package, a parcel or a freight delivery.

The datasets of the set of datasets from which the dataset is selected may also comprise further information. As an example, the datasets may comprise information on customs costs or they may comprise information on currency, which is relevant for international shipping.

The set of datasets may be updated regularly or may be pushed to a server in case of changes.

According to an embodiment of the method according to the invention, the method further comprises filtering a set of datasets based on a mandatory requirement to obtain said set of datasets from which said dataset is selected. For instance, a subset of a set of datasets is obtained in order to obtain the set of datasets from which the dataset is selected. For instance, during filtering, only certain datasets are selected for which conditions based on the mandatory requirement are fulfilled for certain parameters. For instance, the mandatory requirement may be explicitly or implicitly obtained (e.g. provided by the user), which may put constraints on the value of certain parameters comprised in the datasets. The mandatory requirement may comprise constraints on one or more parameter. For instance, the mandatory requirements are to the first "5R" of Plowmann (i.e. the right product, to the right customer, in the right amount, at the right place, in the right state), while the user sets the last "2R" (i.e. in the right shipping time, at the right costs) by manipulation of the UI element.

According to an embodiment of the method according to the invention, the method further comprises the step of providing information on the possibility of changing one of the first and the second value, for instance according to an (assumed) interest of the user. For instance, the step of providing information may be triggered. As an example, if the first (or second) state of the UI element (e.g. constituting a first (or second) limit of the UI element) is selected by the user or if the user tries to select a state beyond the first (or second) state (e.g. constituting a first (or second) limit of the UI element), information on the possibility of changing the first (or second) second value (e.g. being an extreme value of the first (or second) parameter) may be provided. The (assumed) interest of the user may be to amend the first (or second) value beyond the extreme value of the first (or second) parameter. As an example, information may be provided on how to change the mandatory requirements, which, for instance, have been selected by the user, in order to change the first (or second) value beyond the extreme value of the first (or second) parameter according to an (assumed) interest of the user. For instance, said information may be provided to the user, for instance as a message, for instance in a message UI element (e.g. in a message box, for instance in a pop-up box). As an example, if the has selected According to an embodiment of the method according to the invention, the mandatory requirement pertains to at least one of a product, a weight of a product, a volume of a product, a delivery point of origin, a delivery point of destination, an ecological footprint, a tracking/tracing option, insurance option. For instance, the (one or more) product may be a product purchased or about to be purchased. Depending on its category, weight, volume and/or dimensions, only certain datasets may fulfill the mandatory requirement (i.e. for instance, only certain shipping options may be available). For instance, the mandatory requirement may be derived from the product purchased or to be purchased. Depending on the delivery point of origin/destination (e.g. address, region, state, country, distribution center, hub) of the dispatcher/consignee only certain datasets may fulfill the mandatory requirement. For instance, the delivery point of destination may be defined or demanded by the user beforehand. For instance, the delivery point of origin may be defined or demanded by the merchant or dispatcher beforehand.

According to an embodiment of the method according to the invention, the method further comprises obtaining the mandatory requirement at least in part from one or more further UI elements. The further UI element may as an example be a check box, a radio button, a text field, a slider or a button. Preferably, the mandatory requirement obtained from one or more further UI elements (e.g. one or more check boxes) pertains to at least one of an ecological footprint, a tracking option, an insurance option. The one or more further UI elements may be presented to the user at the same time the UI element is presented to the user.

According to an embodiment of the method according to the invention, at least one of the first parameter and the second parameter pertains to one of a performance and costs. For instance, a performance may be the speed at which a consignment is delivered or the time period it takes for a consignment to be delivered. A higher performance resulting in a higher speed/shorter time. For instance, the costs may be monetary costs. For instance, the costs may comprise the costs necessary to achieve the performance (e.g. shipping costs). For instance, the first parameter may pertain to a performance and the second parameter pertains to costs.

According to an embodiment of the method according to the invention, at least one of the first parameter and the second parameter pertain to shipping information. In particular, the shipping information may pertain to the shipping of one or more products purchased/to be purchased.

According to an embodiment of the method according to the invention, the first parameter pertains to a shipping time. The term shipping time may be understood as the time it takes for the delivery to take place, that it is the delivery period. The shipping time may be provided in hours, days or weeks, for instance. The shipping time may be an approximate shipping time. The shipping time may be a maximum shipping time, i.e. a time after which delivery may be guaranteed. The shipping time may also be the point in time at which the delivery takes place. The shipping time may in this case be provided as (approximate or latest) time and date. The shipping time may for instance be based at least on an empirical value, for instance an average shipping time of past deliveries. The empirical value may be specific to the product (category) to be shipped. For instance, the empirical value may be specific to a merchant selling the product.

The shipping time may also be a time definite delivery time. It has been shown, that benefits for a user may be particularly high in case of time definite deliveries, for instance deliveries which shall take place at a specific time in the future within a specific time window, e.g. in a certain number of days within a time window of one day or even several hours. As an example, if the user wants his shipment to be delivered in exactly 8 days, the user only needs to adjust the UI element according to his/her needs enabling the user to easily find a shipping method that exactly fulfills these specific needs. As the set of datasets may not be limited to a specific shipping provider, that is multiple shipping providers may be covered by the set of datasets, the right shipping provider may be found offering the time definite delivery the user is looking for. As a result, there is no need of an expensive adoption for a time definite delivery on the shipment provider side. The user would just select the best suiting option by means of the UI element.

According to an embodiment of the method according to the invention, the second parameter pertains to costs, said costs at least comprising shipping costs. For instance, the costs may be monetary costs. For instance, the costs may or may not include taxes. For instance, the costs may at least in part be specified by a logistics company. For instance, the costs may comprise further costs, such as costs for additional shipping options (e.g. tracking, carbon neutral shipping and/or insured shipping), taxes, customs duty, handling and/or costs of the one or more products.

According to an embodiment of the method according to the invention, the information provided on the selected dataset comprises at least information on at least one of the value of the first parameter and the value of the second parameter being associated with each other by the selected dataset. For instance, the information provided on the selected dataset may comprise the value of the first parameter and the value of the second parameter. The values may be associated with each other for instance by belonging to the same dataset. For instance, the selected dataset may comprise the value of the first and the second parameter. For instance, the information may be provided in real-time. For instance, the information on the selected dataset may be provided and/or updated every time the UI element is manipulated. The information may also be provided in certain predefined time intervals, e.g. regardless of a manipulation. The information on the selected dataset may be presented to the user, e.g. at least partly comprising a text and/or numbers. As an example, the shipping time and the shipping costs may be provided to the user after having selected a preference between lower shipping costs and lower shipping time by manipulating (e.g. moving) the UI element. Further, the information provided on the selected dataset may also comprise information on the shipping provider, as this information may be of importance to the user.

In a second aspect embodiments of the invention provide an apparatus configured to perform or including respective means for performing the method according to the first aspect. The apparatus is, for example, a data-processing apparatus, for example a server or a client. The apparatus is, for example, a computer cloud.

In a third aspect embodiments of the invention provide an apparatus including at least one processor and at least one memory including computer program code, the at least one memory and the computer program code configured to, with the at least one processor, cause an apparatus at least to perform the method according to the first aspect. The apparatus is, for example, software-configured in order to be able to carry out the method. Software-configured is intended to be understood to mean, in particular, the preparation of the apparatus which is necessary in order to be able to carry out a method, for example in the form of a program on the processor.

A processor is intended to be understood to mean, inter alia, one or more control units, microprocessors, micro control units such as microcontrollers, digital signal processors (DSP), Application-Specific Integrated Circuits (ASIC) or Field Programmable Gate Arrays (FPGA).

A memory is, for example, a program memory and/or a main memory of the processor. A program memory is intended to be understood to mean, inter alia, a non-volatile memory and a main memory to mean a volatile or non-volatile memory, in particular a random access memory (RAM) and/or a flash memory. Non-volatile memories are for example random access memories (RAM) such as for example NOR flash memories or sequential access memories such as for example NAND flash memories and/or read-only access memories (ROM) such as for example EPROM, EEPROM or ROM memories. The memory may, for example, be of tangible form.

According to an embodiment of the second or third aspect, the apparatus includes a network interface for the connection to a network. A network interface is, for example, a wired network interface, such as an Ethernet network interface or a DSL modem, or a wireless network interface, such as a UMTS network interface or an IEEE 802.11 network interface. The network is, for example, a local area network, a wide area network, a virtual network, a radio network, a telephony network and/or the Internet.

In a fourth aspect embodiments of the invention provide a system, including an apparatus (e.g. a first apparatus) according to the second or third aspect, a further apparatus (e.g. a second apparatus) configured to display the UI element and to provide information representative of the user's manipulation of the UI element to the apparatus. For instance, the manipulation of the UI element by the user is performed on the further apparatus. For instance, the apparatus provides the information on the selected data set to the further apparatus. As an example, the apparatus may be a server, e.g. a server of a logistics company or of a merchant, in particular a merchant of an online store. However, the function of the apparatus according to the second or third aspect can also be distributed differently among two (or more) apparatuses and/or can also be jointly performed, at least partially, by a plurality of apparatuses. The further apparatus may output at least in part the information provided by the first apparatus. For instance, the information provided by the apparatus may be presented to the user. For instance, the further apparatus may be a client, for instance an (end-user) data processing apparatus, e.g. a desktop, laptop or tablet computer or a portable mobile phone.

In a fifth aspect embodiments of the invention provide a computer program, the computer program when executed by a processor causing an apparatus to perform the actions of the method according to the first aspect. An example of a program according to the invention comprises program instructions for carrying out the method according to the invention at least partially when the program is executed on a processor. A program is, for example, distributable via a network such as a local area network, a wide area network, a virtual network, a radio network, a telephony network and/or the Internet. A program can at least partially be software and/or firmware of a processor. For example, the program according to invention is stored in a memory of the apparatus according to the invention.

In a sixth aspect embodiments of the invention provide a non-transitory computer readable storage medium in which a computer program according to the fifth aspect is stored. An example of a storage medium according to the invention comprises the program according to the invention. The storage medium is, for example, a computer-readable storage medium which contains the program according to the invention and is designed for example as a magnetic, electrical, electromagnetic, optical and/or other type of storage medium. The storage medium may, in particular, be a physical, a non-transitory and/or tangible storage medium. The storage medium is, for example, portable or permanently installed in an apparatus. The storage medium is, for example, of tangible form. "Computer-readable" is intended to be understood, to mean, in particular, that the storage medium can be read (out) or written by a computer or a data-processing apparatus, for example by a processor. The storage medium is, for example, a program memory of a processor.

It is understood that through the description of an additional method step of the method according to the invention corresponding means to carry out the method step of the apparatus according to the invention and a corresponding program instruction of the program according to the invention are also intended to be regarded as disclosed. The same is intended to apply to the disclosure of a means for carrying out a method step or a program instruction, for example the disclosure of a means to carry out a method step is also intended to be understood as the disclosure of the corresponding method step and a corresponding program instruction.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6a-c are example embodiments of sets of datasets;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
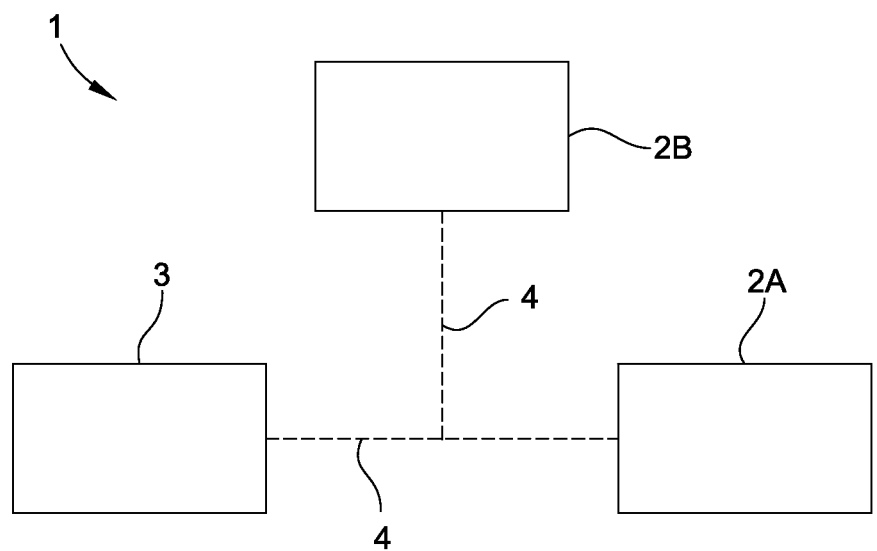
FIG. 1 is a block diagram of an example embodiment of a system according to the invention.

FIG. 1 shows a block diagram of an example embodiment of a system 1 according to invention. The system 1 comprises, inter alia, servers 2A, and 2B.

The server 2A is a server of a merchant of an online web store and makes online web store services available to one or more users. The server 2B is a database server of logistics company making logistics services available for one or more users, in particular for the merchant of the online web store. Server 2B makes available sets of datasets pertaining to the shipping of consignments. The sets of datasets may be pushed from server 2A to server 2B, if needed. The servers 2A and 2B may be part of a computer cloud. Along with the servers 2A and 2B, there may be further servers involved, for example for providing further services.

The client 3 belongs to a user of the online web store and is connected via a network 4 at least to the server 2A. The client 3 is preferably a personal computer or a portable computer.

The server 2B is similarly connected via the network 4 at least to the server 2A. The network 4 is preferably the Internet.

Figure 2:
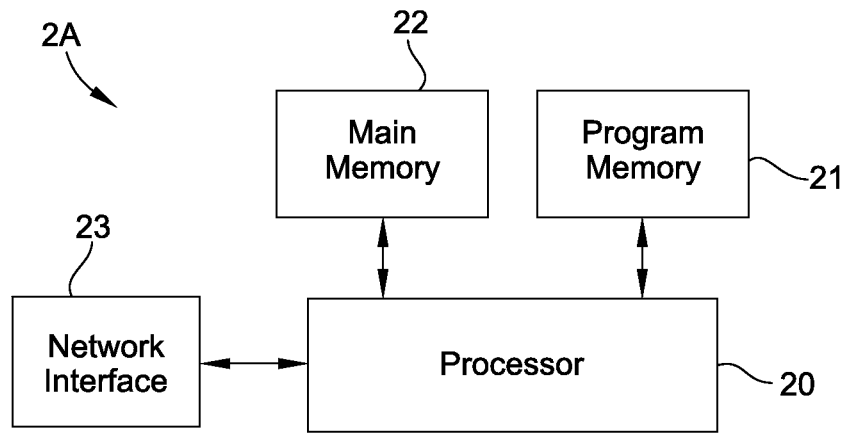
FIGS. 2 and 3 are block diagrams of an example embodiment of a server and a client.

FIG. 2 shows a block diagram of an example embodiment of the server 2A. The server 2A is an example embodiment of an apparatus according to the invention.

The processor 20 of the server 2A executes program instructions which are stored in the program memory 21, and stores, for example, intermediate results or the like in the main memory 22. Furthermore, the processor 20 controls the network interface 23 via which the server 2A connects to the network 4.

Furthermore, the server 2A may have further units, such as, for example an input and/or output unit, e.g. a keyboard, a mouse, a display unit (an LCD display and/or LED indicator lights), a microphone, a touch-sensitive display unit, a loudspeaker, a biometric sensor (e.g. a fingerprint sensor) and/or a camera.

The block diagram of an example embodiment of the server 2B may correspond to the block diagram of the example embodiment of the server 2A. The server 2A and/or 2B are configured, in particular, to be able to store and administer a large number of logistics data records. The servers 2A and 2B have, for example, a comprehensive memory for this purpose.

Figure 3:
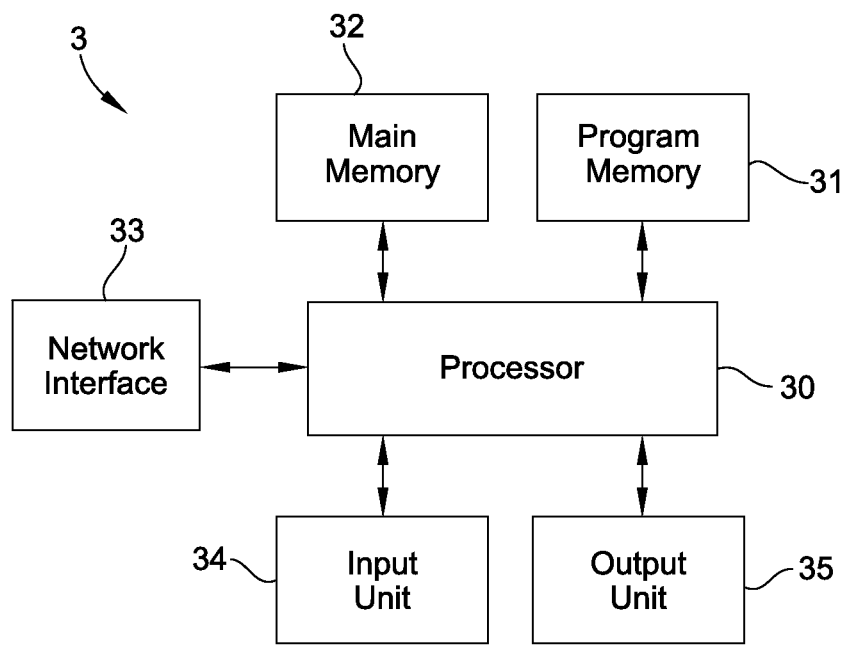

FIG. 3 shows a block diagram of an example embodiment of the client 3. The processor 30 of the client 3 executes program instructions which are stored in the program memory 31, and stores, for example, intermediate results or the like in the main memory 32. Furthermore, the processor 30 controls the network interface 33 via which the client 3 can connect to the network 4 (see FIG. 1).

The client 3 furthermore comprises an input unit 34 and an output unit 35, e.g. a display unit. The input unit 34 may, for example, accept user inputs and forward them to the processor 30. The output unit 35 can receive and output information for the user of the processor 30. The input unit 34 is preferably a mouse, a touch-sensitive screen and/or keyboard, and the display unit 35 is preferably a monitor or another display unit (e.g. a display unit of a touch screen or touch pad).

Figure 4:
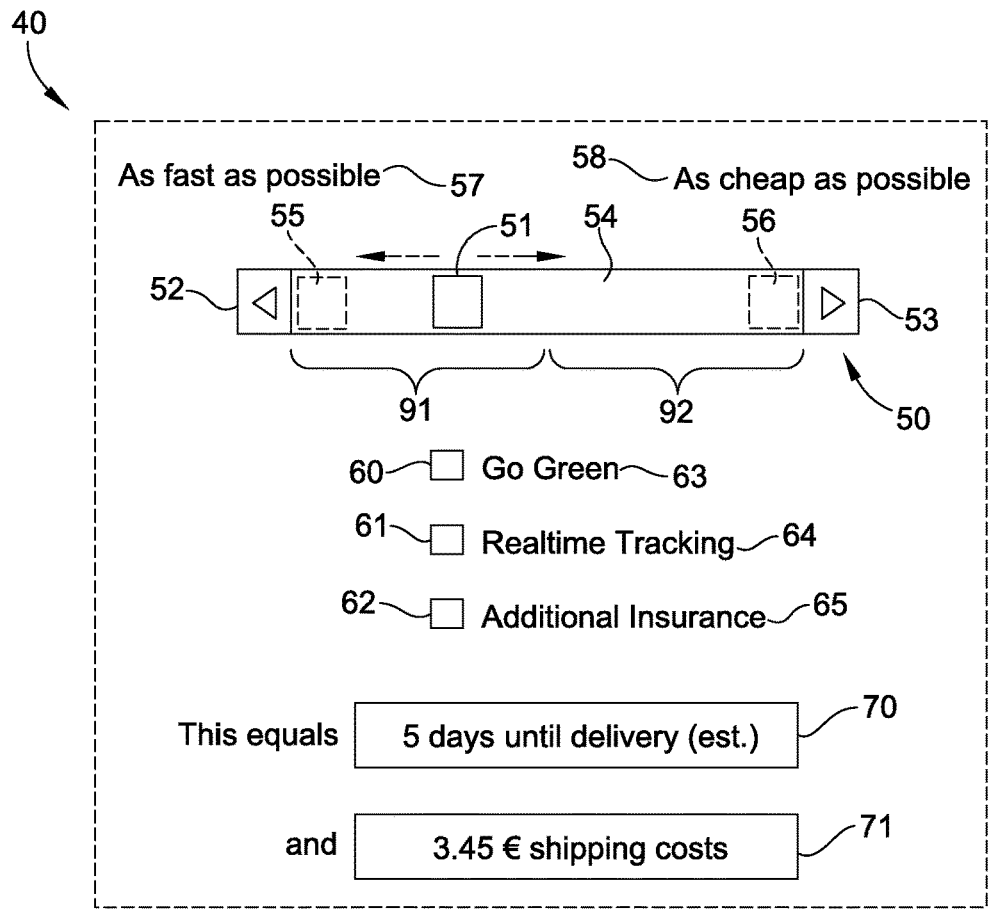
FIG. 4 is an example embodiment of a UI element implemented in a user interface.

FIG. 4 shows an example embodiment of a UI element implemented in a user interface, which can be used in embodiments of different aspects according to the invention. The user interface 40 may be presented to a user of client 3 (see FIG. 1) by outputting the user interface 40 on output unit 35 (see FIG. 3), for example. The user interface 40 may be presented to a user of an online web store by the merchant before after or during finalization of a purchase.

The user interface 40 comprises a slider 50 comprising an example embodiment of a UI element according to the invention in the form of a slider thumb 51. The slider 50 further comprises optional control buttons 52, 53 and a slider track 54. The slider thumb 51 can be brought into different states on the slider track 54. The slider thumb 51 allows for a one-dimensional translatory or linear sliding movement of the slider thumb 51 on the slider track 54 in order to select the states of the slider thumb, i.e. the different positions on the slider track. This is visualized by the dashed arrows above the slider thumb 51. For instance, the user can manipulate the slider thumb by using a mouse, keyboard or touch screen, e.g. by dragging the slider thumb in a translatory or linear motion by interaction with the mouse or touchscreen or by using keys (g. left/right arrow keys) of the keyboard. The optional control buttons 52, 53 may also be used to move the slider thumb 51 into different states by clicking on the control buttons 52, 53.

A first state 55 of the slider thumb 51 is shown in dashed lines at one end of the slider track 54 and a second state 56 of the slider thumb 51 is shown in dashed lines at the other end of the slider track 54. These states 55, 56 constitute a first and a second limit of the slider thumb 51, as the slider thumb 51 cannot move past these extreme positions. The first state 55 is associated with a value of a first parameter, i.e. in this case shipping time, while the second state 56 is associated with a value of a second parameter, i.e. in this case shipping costs. In this case the first value is an extreme value of the first parameter, i.e. the shortest shipping time possible, while the second value is an extreme value of the second parameter, i.e. the lowest costs possible. This is also indicated by the text indicators 57, 58 close to the respective states 55, 56. In this example the indicators 57, 58 are relative indicators, that is the indicators 57, 58 provide relative information about the first and second value.

The states in between the first and the second state are associated with values of either the first or the second parameter, as well. The way of associating respective values to respective states may differ depending on the nature of the parameters and on the situation. An example of associating each of the different states of the UI element 51 with a value of the first or second parameter will be explained in connection with FIG. 6b, 6c.

The user can adjust the slider thumb 51 on the slider track 54 according to his desire of either a shorter shipping time or lower costs for the shipping process of a product purchased or to be purchased. As the first state 55 represents a shipping time as short as possible, this state 55 (and the states of the slider thumb 51 closer to the first state 55) is considered associated with the parameter of shipping time, as the costs are of minor importance to the user or are rather circumstantial or irrelevant in that case. Likewise as the second state 56 represents costs as low as possible, this state 56 (and the states of the slider thumb 51 closer to the second state 56) is considered associated with the parameter of costs, as the shipping time is of minor importance to the user or is rather circumstantial or irrelevant in that case. In other words, the user has a controlled influence on the first parameter (i.e. shipping time) when moving the slider thumb 51 in the area of the first state 55, i.e. closer to the left side of the slider thumb, but the user has not necessarily a direct control over the costs. Vice versa, the user has a controlled influence on the second parameter (costs) when moving the slider thumb 51 in the area of the second state 56, i.e. closer to the right side of the slider thumb, but the user has not necessarily a direct control over the shipping time.

The user interface 40 comprises further UI elements 60, 61, 62 in the form of check boxes. The user can select additional options by checking the check boxes 60-62. As indicated by text 63, by checking box 60, shipping will be performed with a reduced ecological footstep, i.e. with a reduced emission of greenhouse gases, such as carbon dioxide. As indicated by text 64, by checking box 61, real-time tracking will be available for the user during shipping. As indicated by text 65, by checking box 62, the consignment will be insured during shipping to a higher extent. There may be fewer or further check boxes as indicated by the dots. The requirement is considered mandatory, since when an option is selected, it is considered that the user wishes the shipping only to be performed in the indicated way.

Depending on the state of the UI element 51 a dataset can be selected from a set of datasets, which dataset comprises information on a shipping option which can satisfy the user's demands. An example of such a set of datasets will be described in connection with FIGS. 6a-6c.

The user interface 40 further comprises text fields 70, 71 as output elements for outputting information on the selected dataset. Text field 70 provides information on the value of the first parameter (i.e. shipping time in this example) while text field 71 provides information on the value of the second parameter (i.e. costs in this example). The information comprises absolute values of the (estimated) shipping time, i.e. the time until delivery, and the absolute value of shipping costs.

In case the UI element 51 is manipulated by the user, i.e. moved along the slider track 54, the information in the text fields 70, 71 is updated automatically.

Figure 5:
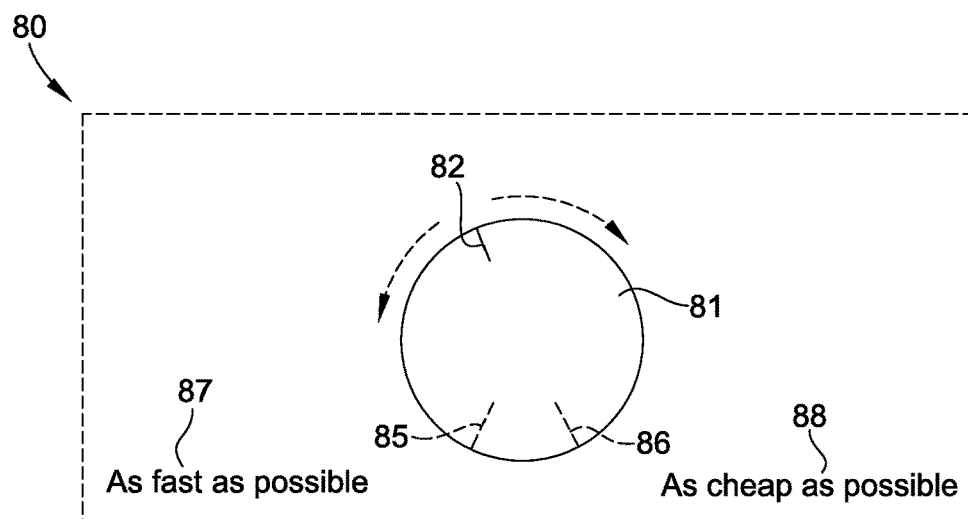
FIG. 5 is an alternative example embodiment of a UI element implemented in a user interface.

FIG. 5 is an alternative example embodiment of a UI element 81 implemented in a user interface 80. The user interface 80 can be used instead of the slider 50 and texts 57, 58 in user interface 40. The user interface 80 comprises a UI element 81 in the form of a turning knob (e.g. a rotatable knob). As the turning knob 81 allows for a rotary movement of the turning knob 81, the turning knob 81 can be brought into different states and one of the states can be selected by the rotary movement of the turning knob 81. The different states correspond to different orientations of the turning knob. The turning knob 81 comprises an indicator 82 to indicate the current state (i.e. the orientation) of the turning knob 81. This is visualized by the dashed arrows above the indicator 82. For instance, the user can manipulate the turning knob by using a mouse, keyboard or touch screen by dragging the turning knob 81 in a rotary motion.

A first state 85 of the turning knob 81 is shown with a dashed line indicator and a second state 86 of the turning knob 81 is shown with a second dashed line indicator. These states 85, 86 constitute a first and a second limit of the turning knob, as the turning knob cannot move past these extreme positions. As in the example embodiment of a slider thumb (see FIG. 4), the first state 85 is associated with a value of a first parameter (shipping time), while the second state 86 is associated with a value of a second parameter (shipping costs). As before, the first value is an extreme value of the first parameter, i.e. the shortest shipping time possible, while the second value is an extreme value of the second parameter, i.e. the lowest costs possible. This is also indicated by the text indicators 87, 88 close to the respective states 85, 86. Again, the states in between the first and the second state are associated with values of either the first or the second parameter, as well. The way of associating respective values to respective states may differ depending on the nature of the parameters and on the situation. The associating of each of the different states of the UI element 81 with a value of the first or second parameter may be done in the same way as with UI element 51.

Similar to the first example of the UI element 51, the user can adjust the turning knob 81 according to his desire of either a shorter shipping time or lower costs for the shipping process of a product purchased or to be purchased. Again, the first state 85 (and the states of the turning knob 81 closer to the first state 85) is considered associated with the parameter of shipping time, as the costs are rather irrelevant on that end of the turning knob. Likewise the second state 86 (and the states of the turning knob 81 closer to the second state 86) is considered associated with the parameter of costs, as the shipping time is rather irrelevant on that end of the knob. As before, the user has a controlled influence on the shipping time when turning the turning knob 81 in the area of the first state 85 and the user has a controlled influence on the shipping costs when turning the turning knob 81 in the area of the second state 86.

The presentation and manipulation of the UI element 51 or 81 described above can for instance be performed by the user on the apparatus 3. Information on the manipulation (e.g. (a change of) the state of the UI element) would then be provided to and obtained by apparatus 2A. Apparatus 2A can then select a dataset based on the obtained information. Information on the dataset (e.g. absolute values of the shipping time and shipping costs) can then be provided to and obtained by apparatus 3, where the information (or a part thereof) can be output.

Turning now to FIG. 6*a-c*, there are illustrated example embodiments of sets of datasets, which can be used in embodiments of different aspects according the invention.

FIG. 6*a* is an example embodiment of a set 100*a* of datasets 101-115. The set 100*a* has the format of a table, even though other structures of a set of datasets may be used as well. Each of the rows (except the header) constitutes a different dataset 101-115. Each column 121-134 represents a parameter. Each dataset 101-115 may or may not comprise a value for each of the parameters 121-134. An empty entry for a parameter of a certain dataset may also be understood as the value NA.

Column 121 comprises values for the parameter "ID", which may a unique running number and which be assigned for internal referencing, for example. Columns 122-134 comprise shipping information. Column 122 comprises values for the parameter "tradelane", which values indicate the country of origin and of destination. Column 123 comprises values for the parameter "Network", which values indicate a shipping network of a logistics company. Column 124 comprises values for the parameter "Service", which values indicate a specific service used by the logistics company within the network to ship a consignment. Column 125 comprises values for the parameter "Price", which values indicate the shipping costs for the specific dataset. Column 126 comprises values for the parameter "delivery time", which values indicate the shipping time in days, that is the time until delivery, for the specific dataset. Column 127 comprises values for the parameter "Max. Weight in kg", which values indicate the maximum allowable weight for a consignment to be shipped under the conditions indicated by the specific dataset. Column 128 comprises values for the parameter "Special Requirements", which values indicate a special requirement, which needs to be met, when a consignment is to be shipped under the conditions given by the specific dataset, in particular by the specific service. For instance, certain discounted services may only be available if the shipped product is a book. Columns 129 and 134 comprises values for the parameter "Tracking included" and "carbon neutral included", respectively. The respective value (e.g. yes, no/NA) indicates whether a tracking of the consignment during shipping or a carbon neutral shipping is already included without extra charge in the shipping costs. Columns 130-133 comprise values for restrictions on different dimensions, if applicable.

As can be seen from the different datasets (i.e. the different rows) in FIG. 6*a*, dozens of shipping options may be available, when a certain consignment needs to be shipped from its origin to the destination. If further different logistics companies are taken into account, the number of available shipping options may multiply accordingly. It may be tedious for a user or customer to find the right shipping option by comparing every option with every other option. Therefore, only a pre-selected handful of the available options is passed on to the (end-)user in the first place. However, this may limit the possible options for the user. It will become clear in connection with FIG. 6*b*, 6*c*, how a single UI element such as UI element 51 or 81 is used in connection with the dataset 100*a* to comfortably select a shipping option, comprises two parameters (shipping time and shipping costs) at the same time, which fits the demands of the user without drawback on the number of shipping options to choose from.

FIG. 6*b* shows a set of datasets 100*b*, which is obtained by the set 100*a* undergoing a first sorting process, wherein the different datasets 101-115 of the set 100*a* were sorted by the first parameter costs, in this case denoted "price" in column 125. The datasets 101-115 are sorted in an ascending manner with the lowest price being the first dataset in the set 100*b*.

FIG. 6*c* shows a set of datasets 100*c*, which is obtained by the set 100*a* undergoing a second sorting process, wherein the different datasets 101-115 of the set 100*a* are sorted by the second parameter shipping time, in this case denoted "delivery time" in column 126. The datasets 101-115 are sorted in an ascending manner with the shortest delivery time being the first dataset in the set 100*c*.

After the first sorting process, each state of a first subset of the states of the UI element, e.g. UI elements 51, 81, is associated with one of the values of the first parameter of column 125 of the datasets of the set 100*b* in an order resulting from the respective sorting. With respect to the UI element 51 and set 100*b* of FIG. 6*b*, the first subset of states may be the subset 91, which is substantially a first half of the states of UI element 51 on one side of the slider (see FIG. 4). The subset 91 of states also comprises the first state 55. For instance, a subset (e.g. the first half) of the datasets of the set 100b may be selected for the association of the states of the first subset 91 with the values of the first parameter of column 125 of the datasets. As the set 100b has an uneven number of datasets (i.e. 15), the largest previous (floor) or the smallest following (ceiling) integer of half the number may be used. As an example, the smallest following number, that is 8, has been chosen and the subset 140 of the datasets of the set 100b is used for the association of the states of the first subset 91 with the values of the first parameter of column 125 of the datasets The first half of the values of the first parameter denoted "price" can now be associated with the states of the UI element 51 in the following manner: the first value "1 EUR" of the subset 140 is the extreme (i.e. the minimum) value and is thus being associated with the first state 55, then consecutively associating the further states of the UI element 51 with the values of the first parameter in an ascending order until the last state of the first subset 91 (i.e. the state of the first subset 91 furthest away from the first state) is associated with the last value "10.00 EUR" of the subset 140.

After the second sorting process, it is possible to associate each state of a second subset of the states of the UI element, e.g. UI elements 51, 81, with one of the values of the second parameter of column 126 of datasets of the set 100c in an order resulting from the respective sorting. With respect to the UI element 51 and set 100c of FIG. 6c, the second subset of states may be the subset 92, which is substantially a second half of the states of UI element 51 on the other side of the slider (see FIG. 4). The subset 92 of states also comprises the second state 56. For instance, a subset (e.g. the second half) of the datasets of the set 100c may be selected for the association of the states of the second subset 92 with the values of the second parameter of column 126 of the datasets. Since, as before, the set 100c has an uneven number of datasets, the largest previous (floor) or the smallest following (ceiling) integer of half the number may be used. As an example, the largest previous number, that is 7, has been chosen and the subset 150 of the datasets of the set 100c is used for the association of the states of the second subset 92 with the values of the second parameter of column 126 of the datasets. The first half of the values of the first parameter denoted "delivery time" (in days) can now be associated with the states of the UI element 51 in the following manner: the first value "1" of the subset 150 is the extreme (i.e. the minimum) value and is thus being associated with the second state 56, then consecutively associating the further states of the UI element 51 with the values of the second parameter in an ascending order until the last state of the second subset 92 (i.e. the state of the second subset 92 furthest away from the second state) is associated with the last value "6" of the subset 150.

The states of the UI element 81 can be associated with values of either the first or second parameter accordingly.

A situation may occur, where certain datasets of the set of datasets should not be selectable because of mandatory requirements, for instance because a value of one of the parameters in the respective dataset is not compatible with the product to be shipped or with a selected option of the user (such as real-time tracking or carbon neutral shipping). In that case the set of datasets may first be filtered to obtain the set of datasets, which is then used for the association of the values of the first or second parameter with the states or the UI element and for the selection of a dataset.

For instance, with respect to the set of datasets 100a of FIG. 6a, the product to be shipped may be a book to be shipped from Germany to the US. For instance, dataset 106, having ID 25, may in that case not be a possible, desirable or valid dataset to be selected, as the trade lane is Germany to Germany (see column 122). Dataset 109, having ID 38, may also not be a possible, desirable or valid dataset to be selected, as the Service is limited to post cards (see column 124).

After a corresponding filtering of the set of datasets 100a a new dataset may be obtained, in which datasets 106, 109 have been removed. The new dataset may then be used for an association of values of the first or second parameter with states of the UI element as described above in connection with FIGS. 4-6c.

Figure 7A:
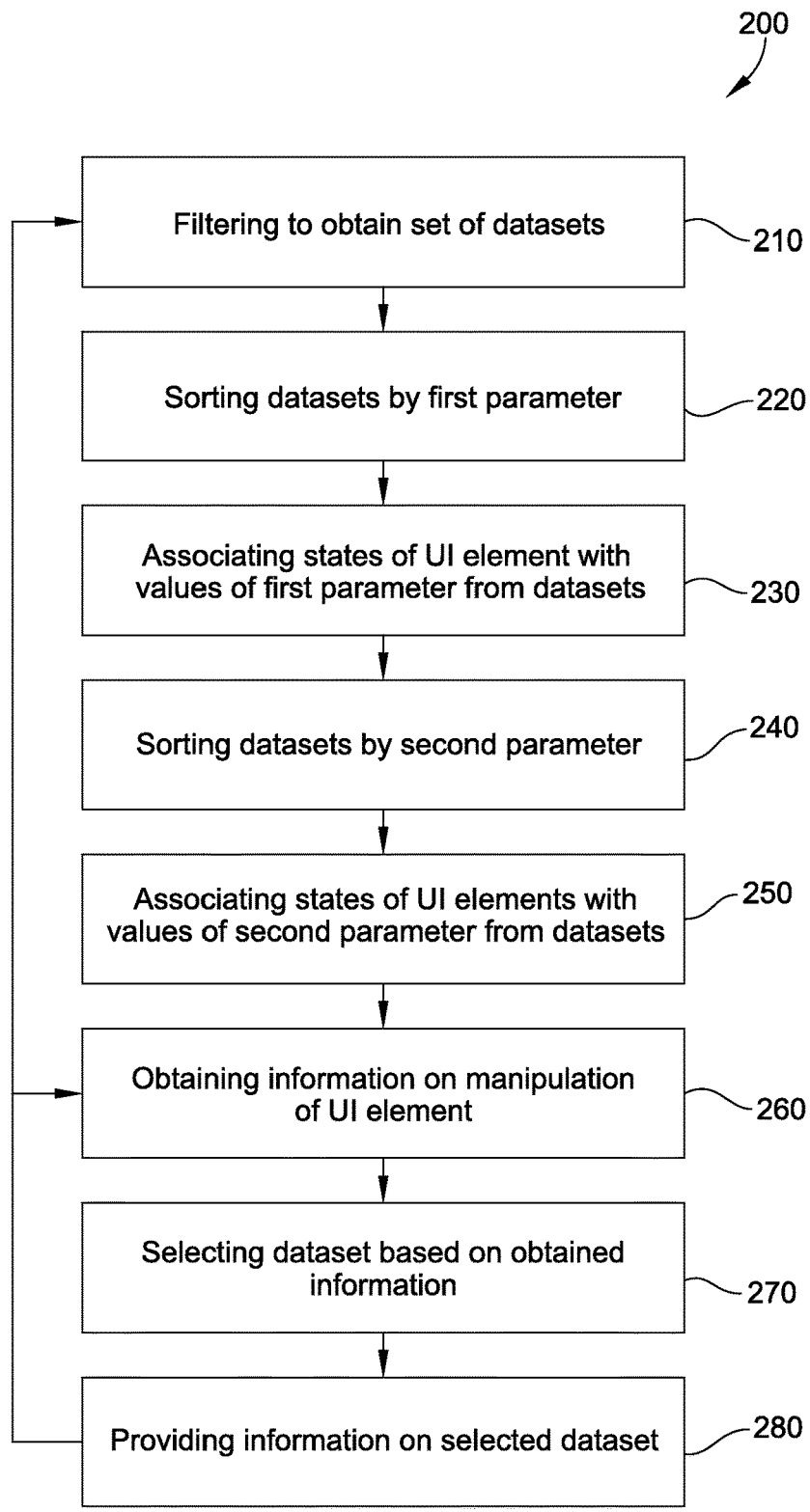
FIGS. 7a and 7b are flow diagrams with method steps of example embodiments of the method according to the invention.

Turning now to FIG. 7a, there is illustrated a flow diagram 200 with method steps 210-270 of an example embodiment of the method according to the invention. The steps 210-270 may be performed by server 2A.

In a first optional step 210, a set of datasets (such as dataset 100a) is filtered based on a mandatory requirement to obtain a set of datasets (such as dataset 100a), which can then be used in the further method steps and from which a dataset can be selected eventually. For instance, in the field of e-commerce, where a dataset comprising shipping information is to be selected, the mandatory requirement may pertain to the product (such as category, weight, dimensions), to a location (such as a delivery point of origin, a delivery point of destination) and/or to a shipping option (such as a specific ecological footprint, a tracking/tracing option, insurance option). The information about mandatory requirements may be readily accessible to the server. For instance, the mandatory requirement may be provided to the server by an online shop, e.g. by a server of an online shop. For instance, the information may be provided to the server via the user interface 40 via check boxes 60-62 (see FIG. 4).

In a step 220, the (filtered) datasets of the set of datasets (e.g. set 100a) is sorted by a first parameter (e.g. parameter "price" as described with respect to FIG. 6b).

In a step 230, each state of a first subset (e.g. a first half) of the states of a UI element (e.g. UI elements 51, 81) comprising a first state (e.g. state 55, 85) is associated with one of the values of the first parameter, comprised by the datasets of the set of datasets in an order resulting from the first sorting of the set of datasets. This can for instance be done, as described with respect to FIG. 6b.

In a step 240, the datasets of the set of datasets (e.g. set 100a) is sorted by a second parameter (e.g. parameter "delivery time" as described with respect to FIG. 6c).

In a step 250, each state of a second subset (e.g. a second half) of the states of the UI element comprising a second state (e.g. state 56, 86) is associated with one of the values of the second parameter, comprised by the datasets of the set of datasets in an order resulting from the second sorting of the set of datasets. This can for instance be done, as described with respect to FIG. 6c.

In a step 260, information on a manipulation of a UI element performed by a user (e.g. as described with respect to FIGS. 4, 5, e.g. on client 3) is obtained. As the UI element has a plurality of states, the user can select one of the states.

In a step 270, a dataset from the set of datasets (e.g. set of datasets 100a) is selected based on said obtained information. For instance, as the selected state of the UI element is associated with a value of the first or the second parameter comprised by one of the datasets of the set of datasets, the respective dataset is selected.

In a step 280, information on said selected dataset is provided. For instance, as described with respect to FIG. 4, information on the value (e.g. the value itself) of the first and second parameter of the selected dataset may be provided.

In case the UI element is manipulated the method may (e.g. automatically) return to step 260 and obtain updated information on the manipulation of the UI element. In case the mandatory requirements may change, e.g. by (un-) selecting one of the check boxes 60-62, the method may return to step 210 in order to filter the set of datasets in order to obtain a set of datasets fulfilling the mandatory requirements.

Figure 7B:
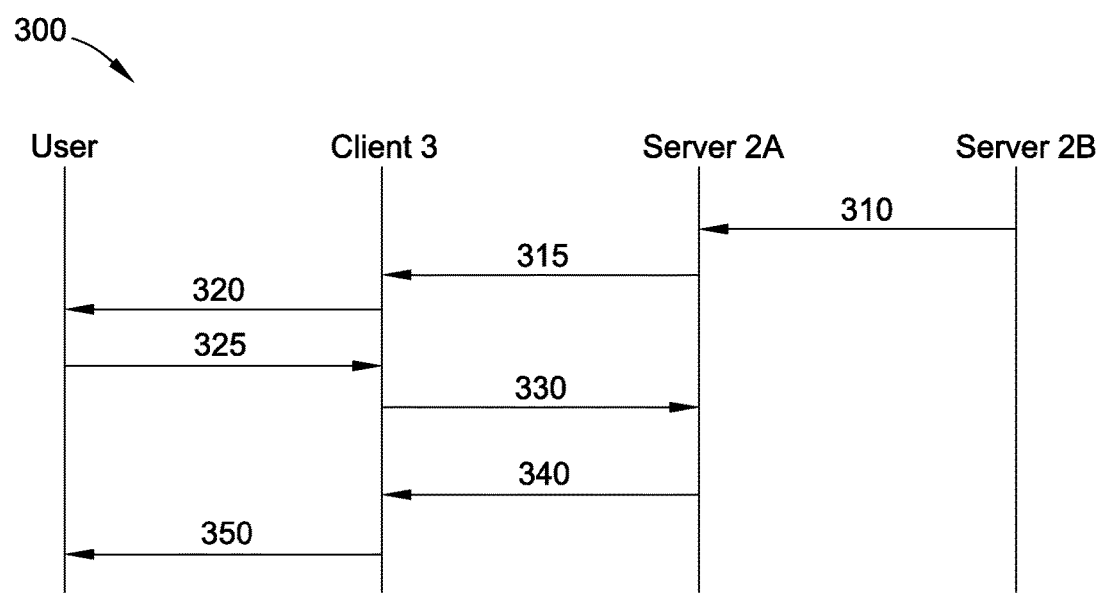

Turning now to FIG. 7b, there is illustrated a flow diagram 300 with method steps of another example embodiment of the method according to the invention.

In a step 310 a database (or parts thereof) comprising the set of datasets (e.g. set of datasets 100a) is pushed from a server 2B of a logistics company to a server 2A of a merchant of an online store.

Server 2A may perform steps 210-250 of diagram 200 (see FIG. 7a), if necessary. In a step 315 the server 2A provides the necessary information to client 3 (e.g. a personal computer) in order for client 3 to present a UI element (e.g. UI elements 51, 81, see FIG. 4, 5) to the user in a step 320. The UI element may be part of a website provided by Server 2A, which the client is visiting.

In a step 325 a user manipulates the UI element on the client 3 in order to provide his preference on two parameters, e.g. costs and shipping time, e.g. as described with respect to FIG. 4, 5.

In a step 330 the client 3 provides information representative of the manipulation to server 2A, the server 2A obtaining the information. Based on the information obtained, the server performs steps 260-270 of diagram 200 (see FIG. 7a), while the information on the selected dataset is provided to and obtained by the client in a step 340.

In a step 350, the client 3 presents the information on the selected dataset to the user. If the user is not satisfied with the values of the parameter, the user can return to step 325 by manipulating the UI element.

Figure 8:
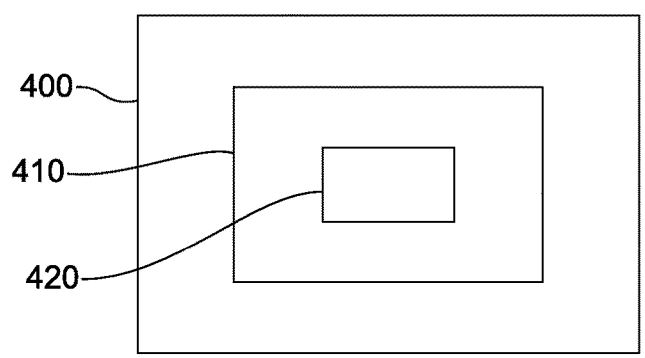
FIG. 8 is a block diagram of an example embodiment of a storage medium according to the invention.

FIG. 8 shows a block diagram of an example embodiment of a storage medium 400 according to the invention. The storage medium is preferably a computer-readable storage medium. The storage medium may, in particular, be a physical and/or tangible storage medium which is readable by at least one of the servers 2A and 2B and/or the client 3. The storage medium may, for instance, be a compact disc (CD), a digital versatile disc (DVD), a USB drive, a secure digital (SD) memory card, a flash drive, a hard disk drive (HDD) or a solid state drive (SSD).

The storage medium 400 comprises a program 410 with program instructions 420. The program instructions 420 cause an apparatus, for example, to carry out at least partially at least some of the steps of the flow diagrams 200 and/or 300 when the program is executed on a processor of the apparatus. For example, the program is executable on at least one of the processors 20 and 30.

The sequence of the method steps in the individual flow diagrams described in this specification is not mandatory, alternative sequences of the method steps being conceivable. The method steps can be implemented in various ways, so that an implementation in software (through program instructions), hardware or a combination of both is conceivable for the implementation of the method steps.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method performed by one or more apparatuses, the method comprising the steps of:
obtaining information on a manipulation of a displayed user interface (UI) element performed by a user, wherein said UI element has a plurality of states allowing for a selection of one of said states by said user,
a first state of said UI element being associated with a first value, said first value being a value of a first parameter, and a second state of said UI element being associated with a second value, said second value being a value of a second parameter different from said first parameter, wherein at least one of said first parameter and said second parameter pertain to shipping information,
selecting a dataset from a set of datasets at least based on said information from said step of obtaining, some or all of said datasets of said set of datasets associating a value of said first parameter with a value of said second parameter,
associating each state of a first subset of states of said plurality of states of said UI element comprising said first state with one of said values of said first parameter only and not with one of said values of said second parameter comprised by said datasets of said datasets from which said dataset is selected, the first subset of states being a first number of consecutive states of the UI element, associating each state of a second subset of states of said plurality of states of said UI element comprising said second state with one of said values of said second parameter only and not with one of said values of said first parameter comprised by said datasets of said dataset from which said dataset is selected, the second subset of states being a second number of consecutive states of the UI element, and providing information on said selected dataset.

2. The method according to claim 1, wherein said first parameter and said second parameter are correlated to each other.

3. The method according to claim 1, wherein said first value of said first parameter associated with said first state of said UI element is an extreme value of said first parameter and said second value of said second parameter associated with said second state of said UI element is an extreme value of said second parameter.

4. The method according to claim 1, wherein said UI element allows for a movement of said UI element in order to select said states of said UI element.

5. The method according to claim 1, wherein said first state of said UI element constitutes a first limit of said UI element and said second state of said UI element constitutes a second limit of said UI element.

6. The method according to claim 1, said method further comprising the steps of:
sorting said datasets of said set of datasets from which said dataset is selected by said first parameter, and
sorting said datasets of said set of datasets from which said dataset is selected by said second parameter,
associating some or all states of a first subset of said states of said UI element comprising said first state with one of said values of said first parameter, comprised by said datasets of said set of datasets from which said dataset is selected, in an order resulting from said sorting of said set of datasets from which said dataset is selected by said first parameter,
associating some or all states of a second subset of said states of said UI element comprising said second state with one of said values of said second parameter, comprised by said datasets of said set of datasets from which said dataset is selected, in an order resulting from said sorting of said set of datasets from which said dataset is selected by said second parameter.

7. The method according to claim 1, said method further comprising the step of:
filtering a set of datasets based on a mandatory requirement to obtain said set of datasets from which said dataset is selected.

8. The method according to claim 1, wherein said first parameter pertains to a shipping time.

9. The method according to claim 1, wherein said second parameter pertains to costs, said costs at least comprising shipping costs.

10. The method according to claim 1, wherein said information provided on said selected dataset comprises at least information on at least one of said value of said first parameter and said value of said second parameter being associated with each other by said selected dataset.

11. An apparatus configured to perform or comprising respective means for performing the method of claim 1.

12. An apparatus comprising at least one processor and at least one memory including computer program code, said at least one memory and said computer program code configured to, with said at least one processor, cause an apparatus at least to perform:
obtaining information on a manipulation of a displayed user interface (UI) element performed by a user, wherein said UI element has a plurality of states allowing for a selection of one of said states by said user,
a first state of said UI element being associated with a first value, said first value being a value of a first parameter, and a second state of said UI element being associated with a second value, said second value being a value of a second parameter different from said first parameter, wherein at least one of said first parameter and said second parameter pertain to shipping information,
selecting a dataset from a set of datasets at least based on said information from said step of obtaining, some or all of said datasets of said set of datasets associating a value of said first parameter with a value of said second parameter,
associating each state of a first subset of states of said plurality of states of said UI element comprising said first state with one of said values of said first parameter only and not with one of said values of said second parameter comprised by said datasets of said datasets from which said dataset is selected, the first subset of states being a first number of consecutive states of the UI element,
associating each state of a second subset of states of said plurality of states of said UI element comprising said second state with one of said values of said second parameter only and not with one of said values of said first parameter comprised by said datasets of said dataset from which said dataset is selected, the second subset of states being a second number of consecutive states of the UI element, and
providing information on said selected dataset.

13. The apparatus according to claim 12, wherein said first parameter and said second parameter are correlated to each other.

14. The apparatus according to claim 12, said at least one memory and said computer program code configured to, with said at least one processor, further cause said apparatus to perform:
sorting said datasets of said set of datasets from which said dataset is selected by said first parameter, and
sorting said datasets of said set of datasets from which said dataset is selected by said second parameter,
associating some or all states of a first subset of said states of said UI element comprising said first state with one of said values of said first parameter, comprised by said datasets of said set of datasets from which said dataset is selected, in an order resulting from said sorting of said set of datasets from which said dataset is selected by said first parameter,
associating some or all states of a second subset of said states of said UI element comprising said second state with one of said values of said second parameter, comprised by said datasets of said set of datasets from which said dataset is selected, in an order resulting from said sorting of said set of datasets from which said dataset is selected by said second parameter.

15. The apparatus according to claim 12, said at least one memory and said computer program code configured to, with said at least one processor, further cause said apparatus to perform:

filtering a set of datasets based on a mandatory requirement to obtain said set of datasets from which said dataset is selected.

16. A system, comprising:

an apparatus according to claim 12; and a further apparatus configured to display the UI element and to provide information representative of the user's manipulation of the UI element to the apparatus.

17. A non-transitory computer readable storage medium in which a computer program is stored, the computer program, when executed by a processor causing an apparatus to perform:

obtaining information on a manipulation of a displayed user interface (UI) element performed by a user, wherein said UI element has a plurality of states allowing for a selection of one of said states by said user, a first state of said UI element being associated with a first value, said first value being a value of a first parameter, and a second state of said UI element being associated with a second value, said second value being a value of a second parameter different from said first parameter, wherein at least one of said first parameter and said second parameter pertain to shipping information, selecting a dataset from a set of datasets at least based on said information from said step of obtaining, some or all of said datasets of said set of datasets associating a value of said first parameter with a value of said second parameter, associating each state of a first subset of states of said plurality of states of said UI element comprising said first state with one of said values of said first parameter only and not with one of said values of said second parameter comprised by said datasets of said datasets from which said dataset is selected, the first subset of states being a first number of consecutive states of the UI element, associating each state of a second subset of states of said plurality of states of said UI element comprising said second state with one of said values of said second parameter only and not with one of said values of said first parameter comprised by said datasets of said dataset from which said dataset is selected, the second subset of states being a second number of consecutive states of the UI element, and providing information on said selected dataset.

* * * * *